United States Patent
Lei et al.

(10) Patent No.: US 8,505,982 B2
(45) Date of Patent: Aug. 13, 2013

(54) CONNECTION DEVICE FOR USE WITH A CORRUGATED TUBE

(75) Inventors: Yanning Lei, Neufam (DE); Michael Gerking, Munich (DE)

(73) Assignee: Schlemmer GmbH, Poing (DE)

( * ) Notice: Subject to any disclaimer, the term of this patent is extended or adjusted under 35 U.S.C. 154(b) by 475 days.

(21) Appl. No.: 12/742,050

(22) PCT Filed: Feb. 18, 2009

(86) PCT No.: PCT/EP2009/001150
§ 371 (c)(1),
(2), (4) Date: May 7, 2010

(87) PCT Pub. No.: WO2010/094298
PCT Pub. Date: Aug. 26, 2010

(65) Prior Publication Data
US 2011/0148100 A1   Jun. 23, 2011

(51) Int. Cl.
*F16L 37/00* (2006.01)
(52) U.S. Cl.
USPC ............... 285/319; 285/82; 285/85; 285/308; 285/903; 285/921
(58) Field of Classification Search
USPC ............. 285/319, 903, 82, 85, 305, 308, 314, 285/358, 394, 921, 307, 399
See application file for complete search history.

(56) References Cited

U.S. PATENT DOCUMENTS

| | | | |
|---|---|---|---|
| 5,080,404 A | 1/1992 | Sauer | |
| 5,087,084 A | 2/1992 | Gehring | |
| 6,267,415 B1 | 7/2001 | Frank | |
| 6,908,114 B2 * | 6/2005 | Moner | 285/23 |
| 2003/0155767 A1 | 8/2003 | Hardie et al. | |
| 2007/0273148 A1 * | 11/2007 | Duquette et al. | 285/18 |
| 2008/0007049 A1 * | 1/2008 | Duquette et al. | 285/247 |

FOREIGN PATENT DOCUMENTS

| | | |
|---|---|---|
| DE | 38 15 173 A1 | 11/1989 |
| DE | 39 03 355 A1 | 8/1990 |
| DE | 197 23 410 A1 | 12/1998 |
| DE | 199 43 764 A1 | 4/2001 |
| DE | 10 2005 031 871 B3 | 11/2006 |
| EP | 09 959 667 | 10/1997 |
| EP | 1 039 206 A2 | 9/2000 |

* cited by examiner

*Primary Examiner* — Aaron Dunwoody
*Assistant Examiner* — Fannie Kee
(74) *Attorney, Agent, or Firm* — Douglas J. Christensen

(57) ABSTRACT

In a connection apparatus for a corrugated tube a sealing sleeve, a coupling part, and an insertion part that can be inserted into the coupling part and comprises outwardly protruding latching portions on its outside surface, the coupling part is provided on an outside surface with cooperating latching portions. The coupling part comprises an inner holding device through which the corrugated tube can be guided in the direction towards the insertion part and performs elastically resilient radial movements thereby securing the corrugated tube against withdrawal. The corrugated tube extends into the sealing sleeve sitting in the interior of the insertion part having an axial flow passage, and with the holding device protruding axially into the opening of the insertion part in a coupled state. The outwardly protruding latching portions exposed on the outside of the connection apparatus when in the coupled state. The holding device compressing the sealing sleeve when in the coupled state.

18 Claims, 2 Drawing Sheets by nature, the diameter of the corrugated tube is thus
CONNECTION DEVICE FOR USE WITH A CORRUGATED TUBE

PRIORITY CLAIM

The present application is a National Phase entry of PCT Application No. PCT/EP2009/001150, filed Feb. 18, 2009, the disclosure of which is hereby incorporated by reference herein in its entirety.

FIELD OF THE INVENTION

The invention relates to a connection apparatus for a corrugated tube.

BACKGROUND OF THE INVENTION

A connection apparatus which is arranged as a sleeve is known from DE 39 03 355 A1, in which a corrugated tube is inserted. The corrugated tube inserted into the sleeve can be axially fixed by means of a tongue with a projection facing into the interior of the sleeve for engagement in a wave trough of the corrugated tube, which tongue is formed in the wall of the sleeve and can be deflected in a resilient fashion. In order to seal the same in relation to the sleeve, an O-ring is provided on the one hand which is inserted in a wave trough of the corrugated tube, and furthermore a further seal which rests on the face side against the end of the corrugated tube and which sits on its part in an annular axial groove of the sleeve and rests on the inserted end of the corrugated tube. The O-ring needs to be introduced in a wave trough at the end of the corrugated tube for sealing purposes before the insertion of the corrugated tube, because the seal on the face side frequently is unable to seal in a sufficient manner, especially when forces act on the corrugated tube in the direction out of the tube.

DE 197 23 410 A1 describes a fastening arrangement for a corrugated tube on a substantially hollow-cylindrical connecting piece on which the corrugated tube is slid and is secured there against axial withdrawal of the corrugated tube by means of at least one strut arranged in the longitudinal direction of the corrugated tube. The strut or struts is/are pressed by an annular clamping ring against the outside of the corrugated tube, through which sufficient security against withdrawal of the corrugated tube from the connecting piece is achieved. The corrugated tube is sealed in relation to the connecting piece by an O-ring placed in a wave trough. Two parts are required for the sealing, which are the O-ring and the clamping ring for pressing the struts radially to the inside against the corrugated tube and thus against the connecting piece.

In the connection apparatus according to DE 199 43 764 A1, a corrugated tube is slid on to a connecting piece and held against withdrawal by means of a two-part foldable securing sleeve. Engagement elements for insertion into a wave trough of the corrugated outside shape of the corrugated tube are provided on the inside of the securing sleeve, with the two securing sleeve parts being movable relative to one another and being interlocking with respect to one another and can be latched with the outside of the corrugated tube. The two sleeve parts are fixed in an articulated manner to the connecting piece by means of a film hinge. A very good securing means against undesirable withdrawal of the corrugated tube from the connecting piece is thus achieved. Sealing occurs between corrugated tube and connecting piece only by optimum fit between these two parts that are slid onto one another. A relatively large space is required for flipping up the securing sleeve during mounting, which is often not available in constricted mounting conditions.

Finally, a connection apparatus for a corrugated tube is known from DE 10 2005 031 871 B3, comprising a coupling part in which the insertion part can be introduced. A connecting piece with a connecting nipple is attached to the insertion end of the insertion part, onto which a corrugated tube is slid. Furthermore, a formed seal is provided which sits on the connecting piece and into which the end of the corrugated tube can be slid. A sleeve that can be slid on is arranged axially over this seal, which sleeve comprises elastic struts which can be brought into engagement in two steps with arresting means which are attached to the connecting piece. In a first step, the sleeve is fixed to the connecting piece in such a way that the inside diameter of the seal allows the insertion of the end of the corrugated tube, whereas in the second stage the sleeve is slid completely over the seal and its struts are connected in a fixing manner with the arresting means. The seal is pressed in such a way onto the outside wall of the corrugated tube that the sleeve presses the seal with its inside against the connecting piece and onto the inserted corrugated tube. In order to ensure a truly secure fixing of the corrugated tube in the apparatus, a securing means against withdrawal of the corrugated tube is provided in the form of a two-part, foldable securing sleeve at the end of the apparatus, which sleeve comprises on its inside engagement apparatuses for interlocking engagement in the corrugated outside shape of the corrugated tube when its two half-shells are folded together and locked. Although this known apparatus offers good securing against withdrawal of the corrugated tube from the connecting piece, very reliable sealing between these two parts and it can be supplied in a pre-mounted state, the entire apparatus is still relatively complex and elaborate and its mounting is relatively complex due to the two stages of the locking between coupling part and insertion part and the additional connection and locking of the two-part securing sleeve against withdrawal.

The invention now seeks to remedy this and to provide a connection apparatus for a corrugated tube which has a simplified configuration in combination with good sealing and allows especially rapid mounting.

SUMMARY OF THE INVENTION

A connection apparatus for a corrugated tube in an embodiment comprises a corrugated tube, a coupling part and an insertion part that can be inserted into the coupling part and comprises on its outside jacket outwardly protruding latching cams which are attached in an offset manner in respect to one another over the circumference, with the coupling part being provided on its outside jacket with latching arms which are radially outwardly deflectable, are attached according to the arrangement of the latching cams on the insertion part, and each run over the respectively associated latching cam under elastic radial deflection, and thereafter, upon reaching the coupled state, radially deflect inwardly again in a directly axial manner behind the latching cam under latching, with the coupling part comprising an inner holding device which secures the corrugated tube guided through the coupling part against withdrawal and is capable of performing elastically resilient radial movements, with further the axial end section of the corrugated tube protruding up to a stop in a sleeve sitting in the interior of the insertion part, which sleeve forms an axial flow passage, and with the holding device of the coupling part protruding axially into the facing accommodating opening of the insertion part in the coupled state and being blocked against a release of the securing means against withdrawal of the corrugated tube.

The connection apparatus in an embodiment of the invention is relatively simple in its arrangement at first, has a short overall size and requires an especially low need for space especially also in the radial direction, which is very important in view of the usually constricted installation situation in which such connection apparatuses are used for example in connection with fluid lines in motor vehicles such as transport lines for windscreen washing fluid or the like, and also in other applications. Moreover, the connection apparatus in accordance with the invention can also be made of inexpensive plastic material such as POM for example, because the use of high quality material is no longer required, as is necessary for example for the cold-pressed plate end pieces that were also used in the past.

The connection apparatus in accordance with an embodiment of the invention is usually supplied in a pre-assembled state, in which the insertion part is already inserted in the coupling part with the sealing sleeve already arranged in the same, but only to the extent that the latching arms of the coupling part have not yet run over the latching cams on the insertion part, so that the latching between coupling and insertion part has not yet been performed. In this pre-assembled state, the user is then able to cut off the corrugated tube from rolled material in the desired length, whereupon the tube is slid into the opening of the coupling part from the outside and then through the same and is then introduced into the sealing sleeve up to the limit stop at its end. During the insertion, the latching arms of the coupling part are radially deflected at the outside shape of the corrugated tube, so that the corrugated tube can be slid in without obstruction up to the limit stop on the end flange of the sealing sleeve without any difficulties. In the inserted state, the latching arms of the coupling part latch together with the outside shape of the corrugated tube in that the latching sections protruding from the said latching arms engage in a wave trough between two wave peaks on the outside of the corrugated tube. Any withdrawal of the corrugated tube from the insertion and coupling part is then no longer possible because in a returning motion of the corrugated tube the latching arms of the coupling part will no longer deflect outwardly. When the user has slid the corrugated tube up to the limit stop into the pre-assembled arrangement, he only needs to subsequently move the coupling and insertion part axially towards one another until the latching arms are latched on the outside of the coupling part with the respectively associated latching cams on the outside on the insertion part. During said subsequent axial movement, the holding device in the interior of the coupling part is slid axially into the facing accommodating opening of the insertion part, at least over an initial axial section, thus protrudes there into the insertion part and rests in this process on its inside jacket in such a way that the securing means against withdrawal of the corrugated tube as achieved by the holding device is blocked against a release of the same. In the pre-assembled state, i.e. during the sliding of the corrugated tube through the coupling part, the inner holding device of the latter is not in engagement with the insertion part so that the motions required for any unhindered insertion of the corrugated tube, such as radial outward deflecting motions when the holding device consists for example of axially extending spring bars with latching projections facing radially to the inside at their protruding ends, can be performed in an entirely unobstructed manner.

During the subsequent axial joining of coupling part and insertion part, the holding device in the interior of the coupling part comes to rest on the end surface of the sealing sleeve that is disposed there, e.g. when it has run slightly into the facing accommodating opening of the insertion part, with the dimensioning of the end surface of said sealing sleeve being made in such a way that in the latched state of coupling part and insertion part it is slid together axially by the holding device by a predetermined amount and is thus compressed, through which the sealing between the corrugated tube and the insertion part will become especially effective as a result of the thus occurring pressure build-up within the sealing sleeve.

The sliding of the corrugated tube into the pre-assembled arrangement that is made during the mounting and the subsequent latching of coupling and insertion part are two simple measures that can be performed rapidly and ensure easy and quick mounting of the connection apparatus.

The coupling part with the holding device formed in the interior of the same can be produced in a cost-effective manner from a suitable plastic, preferably of POM, like the insertion part. The sealing sleeve sitting in the interior of insertion part is injection-molded on its part from a suitable elastic material such as EPDM or NBR, or especially preferably from a thermoplastic elastomer.

In the connection apparatus in accordance with an embodiment of the invention, each latching arm of the coupling part preferably comprises two axially aligned side legs which are offset with respect to one another in the circumferential direction of the coupling part and which are connected with one another at their protruding ends via a latching bracket extending in the circumferential direction, with the distance in the circumferential direction between the two side brackets being chosen to such an extent that during the insertion of the insertion part into the coupling part, the latching cam associated with each latching arm is able to axially travel between the two side legs of said latching arm. A simply arranged but very effective latching possibility is thus created which is subsequently capable as a result of the latching bracket to withstand even relatively large detaching forces.

A further embodiment of the connection apparatus in accordance with the invention is also that the holding device of the coupling part comprises substantially axially extending spring tongues which are attached in an offset manner in relation to one another along its circumference. At the end of said spring tongues there is each attached a radially inwardly facing latching protection in the form of a latching nose for example, by means of which it protrudes into a wave trough between two wave peaks of the passing corrugated tube in order to secure the corrugated tube against withdrawal.

The spring tongues are preferably each provided at their protruding ends radially to the outside with an inclined bevel which slopes towards its end and which cooperates during axial insertion of the insertion part into the coupling part with a respective counter-bevel at the inlet portion of the inside of the end region of the insertion part facing the spring tongues, with each spring tongue being blocked in the coupled state in the direction radially to the outside (and thus against a detachment of the securing means against withdrawal of the corrugated tube). An effective securing means against withdrawal of the corrugated tube can thus be ensured in the mounted coupled state of the connection apparatus.

It is further advantageous when in the connection apparatus in accordance with an embodiment of the invention in its coupled state the holding device of the coupling part is pressed by the inside wall of the insertion part against which it rests with its outer jacket surface in blocking interlocking connection with the outside shape of the wall of the corrugated tube.

In the connection apparatus in accordance with the invention, the sealing sleeve which is inserted there in the insertion part, is inserted into the same only loosely at first and is only under pressure in the fully mounted state can have any desired shape. It is advantageously provided with a substantially cylindrical form which converges into a circular stop plate at its end resting on the inserted end of the corrugated tube, in which plate a central circular passage opening is formed. Such a simple shape for the sealing sleeve is very effective because it allows easy insertion of the corrugated tube during mounting and simultaneously also formed a secure limit stop surface for the associated face side of the inserted corrugated tube with the circular stop plate.

In an embodiment of the invention, the insertion part is arranged on its side facing away from the coupling part in such a way that it forms a connecting piece under reduction of its diameter, the inside diameter of which corresponds to the free inside diameter of the corrugated tube. The thus occurring reduction of the inside diameter of the insertion part can be used simultaneously to serve as an axial limit stop for the axial end of the sealing sleeve which faces away from the coupling part.

The connecting piece thus obtained can either be used as a direct connection to a wall, e.g. a container wall of a fluid container of a windscreen washer system in a motor vehicle or the like, or could similarly be connected there via a respective coupling device to the end of another corrugated tube line.

In an embodiment of the invention, each latching cam of the insertion part is provided on its outside circumference with an inclined bevel which slopes downwardly in the insertion direction, against which the respectively associated latching arm travels under elastic radial outward deflection during the axial insertion of the insertion part into the coupling part. An especially effective and exceptionally rapid mounting of coupling part and insertion part can thus be ensured with a minimum of invested time.

In the connection apparatus in accordance with the invention, the coupling part and the insertion part are each preferably provided with four latching cams (insertion part) or latching arms (coupling part) which are disposed offset by 90° with respect to one other in the circumferential direction.

In the connection apparatus in accordance with an embodiment of the invention, the coupling part and/or the insertion part are made in an especially preferable way of plastic, and again preferably of POM, and the sealing sleeve is made of a thermoplastic elastomer (TPE).

In an embodiment, at least one further latching cam, but preferably two or four latching cams, are arranged as pre-latching cams at an axial distance from the latching cams, offset in the insertion direction of the insertion part into the coupling part, each of which is placed according to one latching cam and protrudes outwardly from the outside jacket of the insertion part, with the axial distance being chosen according to at least the axial extension of the latching arms. As a result, the coupling part and insertion part can be pre-latched already in a position in which they are not finally latched onto each other, and detachment from one another during transport for example or during handling prior to final latching can be avoided.

The connection apparatus in accordance with an embodiment of the invention generally provides a relatively simply structured arrangement which can be supplied in a pre-assembled manner to the user. The user does not need to purchase the corrugated tube section to be connected in a pre-assembled length, but is able to wind and cut off the wound material himself. Moreover, the connection apparatus in accordance with the invention can be mounted quickly, with the employed seal which is under axial compressive pretensioning in the cranked state ensuring outstanding sealing between corrugated tube and insertion part.

DESCRIPTION OF THE DRAWINGS

The invention is now explained in principle in closer detail by reference to the drawings, wherein.

DETAILED DESCRIPTION

Figure 1:
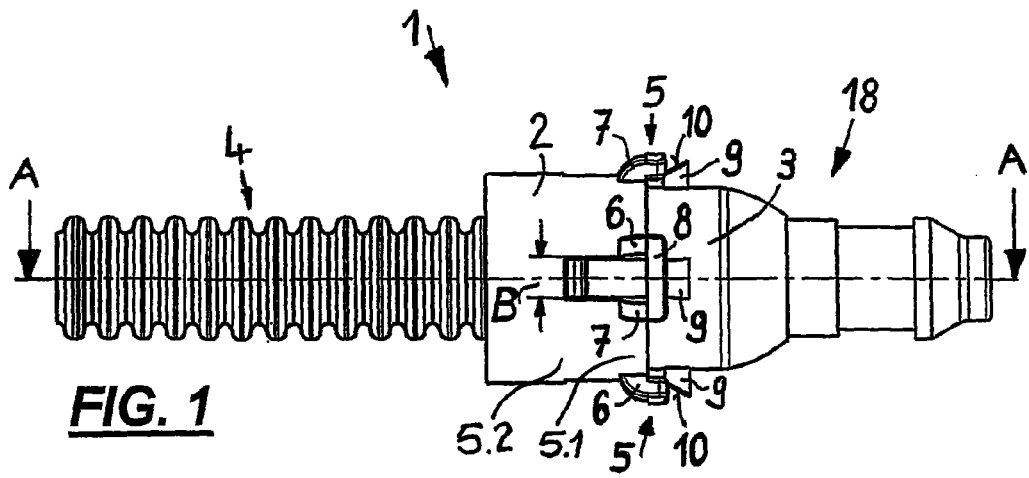
FIG. 1 shows a side view of a connection apparatus in accordance with the invention in the pre-assembled state, in which a corrugated tube has already been inserted.

FIG. 1 shows a connection apparatus 1 in a side view, comprising a coupling part 2 and an insertion part 3 which is partly inserted in the same, in which an end piece of a corrugated tube 4 has been inserted from the side of the coupling part 2.

Four latching arms 5 are provided on the circumference of the coupling part 2 in its end region 5.1 of its jacket 5.2 facing the insertion part 3, which latching arms are offset with respect to one another by 90° in the circumferential direction, protrude from the outside jacket surface 5.3 of the coupling part 2, face towards the insertion part 3, define an aperture 5.4 and can be radially outwardly deflected. In the embodiment shown in the drawings, each latching arm 5 is formed by two side legs 6 and 7 which extend outwardly in a curved manner from the outside jacket surface of the coupling part 2 and in the direction towards the insertion part 3, and are spaced from one another by a distance B in the circumferential direction. The legs are connected with each other at their freely protruding ends via a latching bracket 8 (in the form of a transverse bracket) which on its part has an alignment which is perpendicular to the longitudinal central line of the connection apparatus (facing in the circumferential direction), as shown in the side view as in FIG. 1.

Latching cams 9 are attached to the outside circumference of the insertion part 3 associated to each of the latching arms 5, which latching cams are again offset with respect to one another in the circumferential direction by 90° each and protrude radially to the outside, which occurs in such a way that, as shown in FIG. 1, when the coupling part 2 and insertion part 3 are axially pushed together (at the end of mounting) each latching bracket 8 associated with each latching cam 9 is outwardly deflected via an inclined bevel 10 under elastic outward deflection of the side legs 6 and 7 (radially to the outside), which inclined bevel is attached to the radially outer end of the associated latching cam 9, and simultaneously the respective latching cam 9 is able to pass between the two side legs 6 and 7 to the side of the respective latching bracket 8 which is opposite of its position in FIG. 1. When it has passed completely beneath the latching bracket 8 and the same has thus passed beyond the radially outermost end of the oblique surface 10 and the latching cam 9, it deflects back to its radial initial position as shown in FIG. 2, which is directly on the rear side of the respective latching cam 9 facing away from the coupling part 2.

Figure 3:
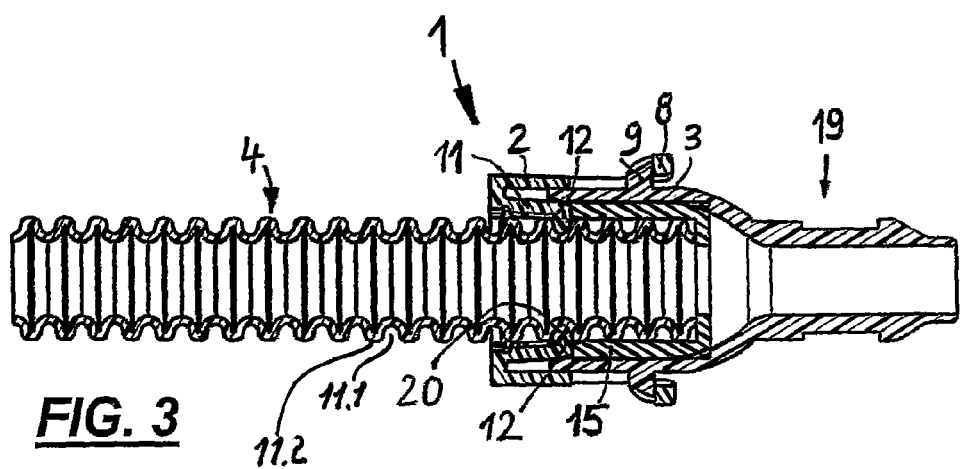
FIG. 3 shows a sectional view corresponding to the sectional view of FIG. 2, but in the latched coupled state (end position) here.

This coupled latched position is shown in FIG. 3 in a sectional view.

Figure 2:
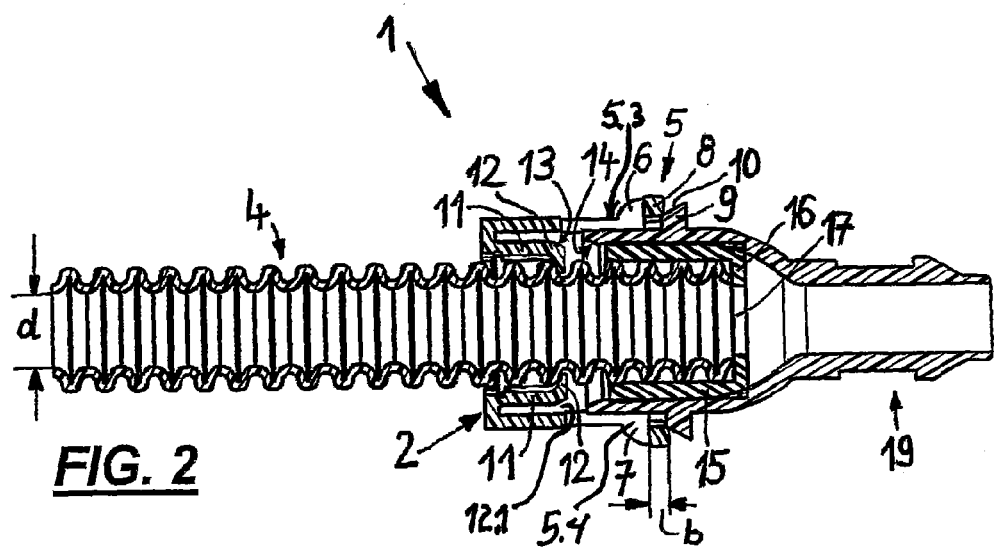
FIG. 2 shows a sectional view through the arrangement of FIG. 1 according to the sectional position A-A in FIG. 1.

As is shown from the sectional view of FIGS. 2 and 3, the coupling part 2 is provided in its interior with a holding device in the form of spring tongues 11 which are arranged in a distributed manner with respect to each other in the circumferential direction and which are shown in FIG. 2, extend substantially coaxially to the longitudinal central line of the connection apparatus 1 and the corrugated tube 4 and are each provided at their ends with a radially inwardly protruding latching projection in the form of a latching nose 12 which engages, in the idle position of the spring tongues 11, in a wave trough 11.1 (between two axially offset wave peaks 112) disposed around the outside shape of the inserted corrugated tube 4. The holding device and outer jacket defining a radial gap 12.1 therebetween.

As is further shown in FIG. 2, each latching nose is provided with an inclined bevel 20 on its rear side facing away from the insertion part 3, which inclined bevel, as is clearly shown in FIG. 2, cooperates during the insertion of the corrugated tube 4 into the coupling part 2 and further on the same into the insertion part 3 with the side flanks of the wave peaks which are disposed at the front in the direction of insertion, through which the spring tongues 11 are pressed radially to the outside to such an extent during insertion until the respective latching nose 12 has run out of the wave trough in which it has engaged at each spring tongue 11 and the corrugated tube 4 can be inserted easily and without any disturbances.

In the fully inserted state of the corrugated tube 4, each latching nose 12 of the spring tongues 11 engages in an interlocking manner in a respective wave trough in the pre-assembled state of coupling part 2 and insertion part 3 and prevents any undesirable return travel of the corrugated tube 4 from the insert part 3 and coupling part 2 because it does not have any inclined bevel on its face side facing the insertion part 3 but is aligned instead perpendicular to the central longitudinal axis of the connection apparatus 1 and the corrugated tube 4.

As is also shown in FIG. 2, each spring tongue 11 is further provided with an inclined bevel 13 on the radial outside circumference of its protruding end, which bevel comes into operative engagement during the further insertion of the insertion part 3 in the coupling part 2 with an opposing inclined bevel 14 which is attached to the end of the associated opening of the insertion part 3 on the same on its inner side.

When the connection apparatus 1 is moved to its coupled end position according to FIG. 3 from the pre-assembled initial position as shown in FIGS. 1 and 2 after the insertion of the corrugated tube 4, the inclined bevels 13 of the spring tongues 11 and 14 of the insertion part 3 run against one another and, after the insertion part 3 has been further inserted into the coupling part 2 by a certain preselected axial distance, the end position of the spring tongues 11 as shown in FIG. 3 occurs finally in the fully coupled state. The spring tongues are pressed slightly radially to the inside from the initial position as shown in FIG. 2 by the inclined bevel 14 of the insertion part 3, so that an especially tight and effective blocking engagement of the latching projections 12 is thus achieved by engagement in a wave trough on the outside circumference of the corrugated tube 4.

As is further shown in FIG. 2, a sealing sleeve 15 has been introduced into the interior of the insertion part 3 already in the pre-assembled state of the connection apparatus 1, which sealing sleeve consists of a suitable material, preferably of TPE, and substantially has the shape of a cylindrical sleeve which converges at its end averted from the coupling part 2 into a circular stop plate 16 which is disposed perpendicularly to the central axis of the connection apparatus 1 and the corrugated tube 4. It comprises a central circular opening 17 which is approximately as large as the free inside diameter d of the corrugated tube 4.

The housing of the insertion part 3 forms a connecting piece 18 on its side averted from the coupling part 2 at an axial distance from the latching cam 9 under reduction of its outside and inside diameter. As is shown in FIGS. 2 and 3, there is a support of the sealing sleeve 15 in the axial direction in the region of the insertion part 3 in which the reduction in diameter occurs and which then converges into the end section 19 of the connecting piece in that the same moves up against the inside wall of this section which slopes radially downwardly as a result of the reduction in diameter.

The sealing sleeve 15 is inserted only loosely in the interior of the insertion part 3 up to the limit stop in the pre-assembled state, i.e. when the insertion part 3 has been inserted into the coupling part 2 up to the relative assignment as shown in FIGS. 1 and 2.

When the intermediate state according to FIG. 2 has been reached after the insertion of the corrugated tube 4 into the pre-assembled arrangement in that the insertion end of the corrugated tube 4 rests on the circular stop plate 16 of the sealing sleeve 15, the spring tongues 11 are not yet in contact with the facing face wall of the sealing sleeve 15, as is shown in FIG. 2.

When the connection apparatus 1 is moved to its coupled end state as shown in FIG. 3, the freely protruding end surfaces of the spring tongues 11 or latching noses 12 come into abutting contact with the end surface of the sealing sleeve 15 facing the same after moving into the facing opening of the insertion part 3. Since the dimensioning of the parts has been chosen in such a way that after this initial abutting contact the insertion part 3 is pushed further into the coupling part 2 by a further small axial distance, the spring tongues 11 press with their protruding ends against the sealing sleeve 15 and shorten the same axially by the mentioned distance, through which the sealing sleeve 15 is placed under a pretension in the axial direction under simultaneous slight axial shortening. This pretensioning of the sealing sleeve 15 leads to the consequence that the same will rest not only entirely flush and tightly against the facing inside surfaces of the insertion part 3, but also in the region in which the insertion part 3 is provided with a reduction in diameter the pretensioning pressure that builds up in the same will additionally also ensure an especially good contact on the outsides of the wave peaks of the corrugated tube 4, so that in summary exceptional sealing is achieved between the corrugated tube 4 and the insertion part 3.

In this mounting end position of the connection apparatus 1, the spring tongues 11 are permanently prevented by the insertion part 3 from deflecting outwardly, through which an effective withdrawal protection is achieved for the corrugated tube 4.

Figure 4:
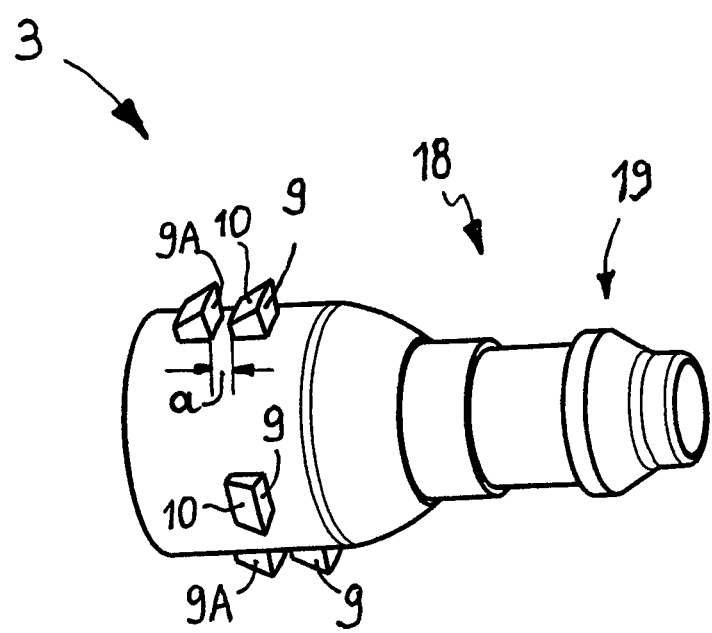
FIG. 4 shows a perspective view of a coupling part according to a further embodiment of the invention.

FIG. 4 shows a perspective view of another embodiment for an insertion part 3, in which two further latching cams are attached as pre-latching cams 9A in addition to the latching cams 9 for final latching at an axial distance a from the side (cf. FIG. 4), which pre-latching cams are offset by 180° with respect to one another, as shown in detail in FIG. 4, with express reference being made in this respect to the graphical illustration. Said pre-latching cams 9A have the same size and shape as latching cams 9 and are used to couple the insertion part 3 which has been inserted up to axial contact of the latching brackets 8 on the latching cams 9, as corresponds to the position of FIGS. 1 and 2, already in this position with the coupling part within the framework of a preliminary latching. As a result, both parts are unable to detach from one another axially in this position, even though not finally latched yet, during transport and handling prior to final latching with the latching cams 9. For the purpose of final latching, both parts only need to be inserted further into each other by an axial distance corresponding to a and the latching arms 5 need to be guided over the inclined surfaces of the latching cams 9, whereupon the final latching has been made.

If desired, the distance a can also be chosen in such a way that it is slightly larger than the axial extension b of the latching arms 5 (cf. FIG. 2). In this case, there would still be a slight axial play between coupling part 2 and the insertion part 3 in the pre-latched state.

The invention claimed is:

1. A connection apparatus in combination with an end section of a corrugated tube, the connection apparatus having a pre-assembled state and a coupled state, the connection apparatus comprising:
   a coupling part comprising an outside jacket with an outside jacket surface, an inner holding device connecting to and spaced radially inwardly from the outside jacket and defining a gap therebetween,
   a sealing sleeve sized to fit over the end section of the corrugated tube and having a limit stop, and
   an insertion part sized for insertion into the coupling part and sized for receiving the sealing sleeve, the insertion part comprising an outside jacket having an outside jacket surface, the insertion part further comprising a plurality of protruding latching cams extending radially outwardly from said outside jacket surface and circumferentially spaced with respect to one another,
   wherein the coupling part further comprises a plurality of latching arms extending outwardly from the coupling part's outside jacket surface, the plurality of latching arms radially outwardly elastically deflectable from an undeflected position and are positioned corresponding to the plurality of protruding latching cams on the insertion part, whereby each latching arm of the plurality of latching arms elastically deflects radially outwardly as said latching arm runs over a respective associated protruding latching cam of the plurality of protruding latching cams during an axial insertion of the insertion part into the coupling part and upon reaching a coupled state, each latching arm passes the respective protruding latching cam and returns inwardly to the undeflected position,
   wherein when the connection apparatus is in the pre-assembled state, the end section of the corrugated tube can be guided through the inner holding device in a direction towards the insertion part, with the inner holding device providing elastically resilient radial movements allowing the end section to pass thereby up to the limit stop in the sealing sleeve seated in an interior of the insertion part, which sleeve forms an axial flow passage,
   and wherein when the connection apparatus is in the coupled state, the inner holding device of the coupling part protrudes axially into a facing opening of the insertion part and the elastically resilient radial movements of the inner holding device are blocked preventing withdrawal of the end section of the corrugated tube, the inner holding device being engaged with a facing axial face side of the sealing sleeve thereby axially compressing said sealing sleeve.

2. A connection apparatus according to claim 1, wherein each latching arm comprises two axially extending side legs which are offset with respect to one another circumferentially and the two axially extending side legs are connected with one another at protruding ends via a latching bracket, with a distance in a circumferential direction between the two side brackets sized for allowing each respective protruding latching cam to axially pass between the two axially extending side legs when the connection apparatus is being coupled.

3. A connection apparatus according to claim 1, wherein the inner holding device of the coupling part comprises a plurality of substantially axially extending spring tongues, each having a radially inwardly facing latching nose that protrudes into a wave trough between two wave peaks of the end section of the corrugated tube when the end section of the corrugated tube is within the coupling part.

4. A connection apparatus according to claim 3, wherein each of the plurality of spring tongues are provided with protruding ends having an inclined bevel, each inclined bevel cooperating during axial insertion of the insertion part into the coupling part with a respective counter-bevel on an inside of an end region of the insertion part facing the plurality of spring tongues, wherein when the connection apparatus is in the coupled state, each spring tongue is blocked from deflecting in a radially outward direction by the end region of the insertion part.

5. A connection apparatus according to claim 3, wherein when in the coupled state the inner holding device of the coupling part is pressed radially inward by an inside surface of an end region of the insertion part providing a blocking interlocking connection with the end section of the corrugated tube.

6. A connection apparatus according to claim 3, wherein the sealing sleeve has a substantially cylindrical form and the limit stop is configured as a circular stop plate with a central circular passage.

7. A connection apparatus according to claim 1, wherein when in the coupled state the inner holding device of the coupling part is pressed radially inward by an inside surface of an end region of the insertion part providing a blocking interlocking connection with the end section of the corrugated tube.

8. A connection apparatus according to claim 7, wherein the sealing sleeve has a substantially cylindrical form and the limit stop is configured as a circular stop plate with a central circular passage.

9. A connection apparatus according to claim 1, wherein at least one of the coupling part and the insertion part are comprised of plastic.

10. A connection apparatus according to claim 1, wherein the sealing sleeve has a substantially cylindrical form and the limit stop is configured as a circular stop plate with a central circular passage.

11. A connection apparatus according to claim 1, wherein the insertion part defines a connecting piece on a side facing away from the coupling part, the connecting piece having an inside diameter of which corresponds to an inside diameter of the end section of the corrugated tube.

12. A connection apparatus according to claim 1, wherein each protruding latching cam of the insertion part has a cam surface with an inclined bevel which slopes downwardly in an insertion direction and against which the respectively associated latching arm travels under elastic radial outward deflection during the axial insertion of the insertion part into the coupling part.

13. A connection apparatus according to claim 1, wherein the coupling part and the insertion part each comprise respectively four latching arms and four latching cams which are disposed to be offset in relation to one another by 90° in a circumferential direction.

14. A connection apparatus according to claim 1, wherein the sealing sleeve comprises a thermoplastic elastomeric material (TPE).

15. A connection apparatus according to claim 1, wherein at least one further latching cam is arranged at an axial distance from the plurality of latching cams on the outside jacket of the insertion part.

16. A connection apparatus in combination with a corrugated tube, the connection apparatus having a pre-assembled state and a coupled state, the connection apparatus comprising:
- a coupling part;
- an insertion part; and
- a sealing sleeve having an end piece;
- wherein the insertion part is configured to be inserted into the coupling part, the coupling part and insertion part each having cooperating exteriorly facing and outwardly extending latching features for retaining the coupling part and insertion part in the latched coupled state, the insertion part having an end region;
- wherein the coupling part comprises an outer jacket and an inner holding device radially spaced from and connected to the outer jacket thereby defining a radial gap therebetween, the inner holding device comprising a plurality of axially extending spring tongues each with a radially facing latching nose that protrudes into a wave trough between two wave peaks of the corrugated tube when the corrugated tube is therein, whereby when the connection apparatus is in the pre-assembled state, the plurality of spring tongues are deflectable radially outwardly whereby the corrugated tube may be inserted through the inner holding device towards the insertion part,
- whereby when the coupling part and the insertion part are in the latched coupled state, the inner holding device of the coupling part protrudes axially into an opening of the insertion part and the plurality of spring tongues are radially blocked from deflecting radially outward by the end region of the insertion part extending into and closing the radial gap between the inner holding device and outer jacket thereby preventing a release of the corrugated tube from the connection apparatus.

17. The connection apparatus of claim 16 wherein when the coupling part and insertion part are in the latched coupled state, the sealing sleeve is in a state of axial compression between the coupling part and the insertion part.

18. The connection apparatus of claim 17 wherein the state of axial compression between the coupling part and the insertion part is provided by engagement of an end face of the sealing sleeve opposite the end piece by a nose of the inner holding device of the coupling part.

* * * * *